United States Patent
Ardavanis et al.

(10) Patent No.: US 8,888,409 B2
(45) Date of Patent: Nov. 18, 2014

(54) MULTIPURPOSE DEEPWATER VESSEL

(75) Inventors: Kimon Ardavanis, San Donato Milanese (IT); Luca Canepa, San Donato Milanese (IT); Edoardo Rolla, Bussero (IT)

(73) Assignee: Saipem S.p.A., San Donato Milanese (IT)

( * ) Notice: Subject to any disclaimer, the term of this patent is extended or adjusted under 35 U.S.C. 154(b) by 339 days.

(21) Appl. No.: 13/386,319

(22) PCT Filed: Jul. 21, 2010

(86) PCT No.: PCT/IB2010/001761
§ 371 (c)(1),
(2), (4) Date: May 11, 2012

(87) PCT Pub. No.: WO2011/010207
PCT Pub. Date: Jan. 27, 2011

(65) Prior Publication Data
US 2012/0266797 A1    Oct. 25, 2012

(30) Foreign Application Priority Data

Jul. 22, 2009   (IT) .............................. MI2009A1299

(51) Int. Cl.
*B63B 35/03*   (2006.01)
*F16L 1/18*   (2006.01)
*F16L 1/19*   (2006.01)

(52) U.S. Cl.
CPC .. *B63B 35/03* (2013.01); *F16L 1/19* (2013.01)
USPC .......................................... 405/170; 405/166

(58) Field of Classification Search
CPC .............. B63B 35/03; F16L 1/12; F16L 1/18; F16L 1/19
USPC .................... 405/158, 166, 169, 170
See application file for complete search history.

(56) References Cited

U.S. PATENT DOCUMENTS 3,987,640 A * 10/1976 Goren et al. ................... 405/170
4,591,294 A *  5/1986 Foulkes ......................... 405/170

(Continued)

FOREIGN PATENT DOCUMENTS

EP    0 657 670 A2    6/1995
GB    2 095 787 A    10/1982

(Continued)

OTHER PUBLICATIONS

International Search Report and Written Opinion for International Appl. No. PCT/IB2010/001761, European Patent Office, The Netherlands, mailed on Oct. 26, 2010, 8 pages.

*Primary Examiner* — Frederick L Lagman
(74) *Attorney, Agent, or Firm* — Sterne, Kessler, Goldstein & Fox P.L.L.C.

(57) ABSTRACT

A multipurpose deepwater vessel equipped with a floating structure having a bow, a stern, a weather deck, a first board, and a second board; a J-lay tower hinged to the floating structure along the second board, and movable about a first axis into a number of work positions to join pipe assemblies into an underwater pipeline, and to lay an underwater pipeline; a heavy-duty crane connected at the bow to the floating structure to rotate about a second axis, and having a boom defining an operating range within which the J-lay tower is located in any one of its work positions; and a preassembly line, below the weather deck, for joining pipes into pipe assemblies for supply to the J-lay tower.

20 Claims, 7 Drawing Sheets

(56) References Cited

U.S. PATENT DOCUMENTS

2009/0097924 A1* 4/2009 Hovinga et al. ............... 405/170
2010/0232884 A1* 9/2010 Roodenburg et al. ......... 405/166
2011/0236137 A1* 9/2011 Legaignoux et al. ......... 405/158

FOREIGN PATENT DOCUMENTS

| WO | WO 2005/123566 A2 | 12/2005 |
| WO | WO 2008/107186 A1 | 9/2008 |

* cited by examiner

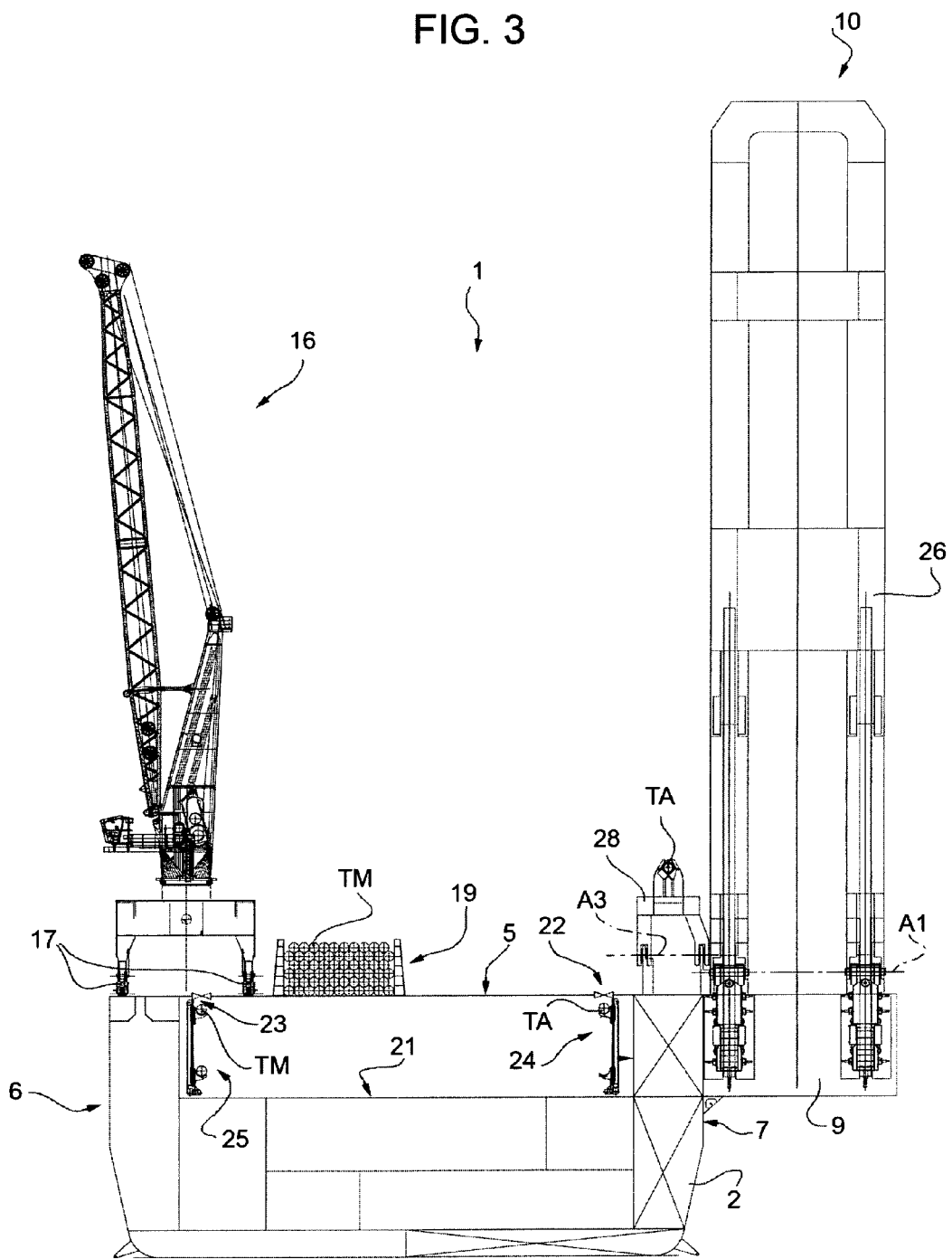

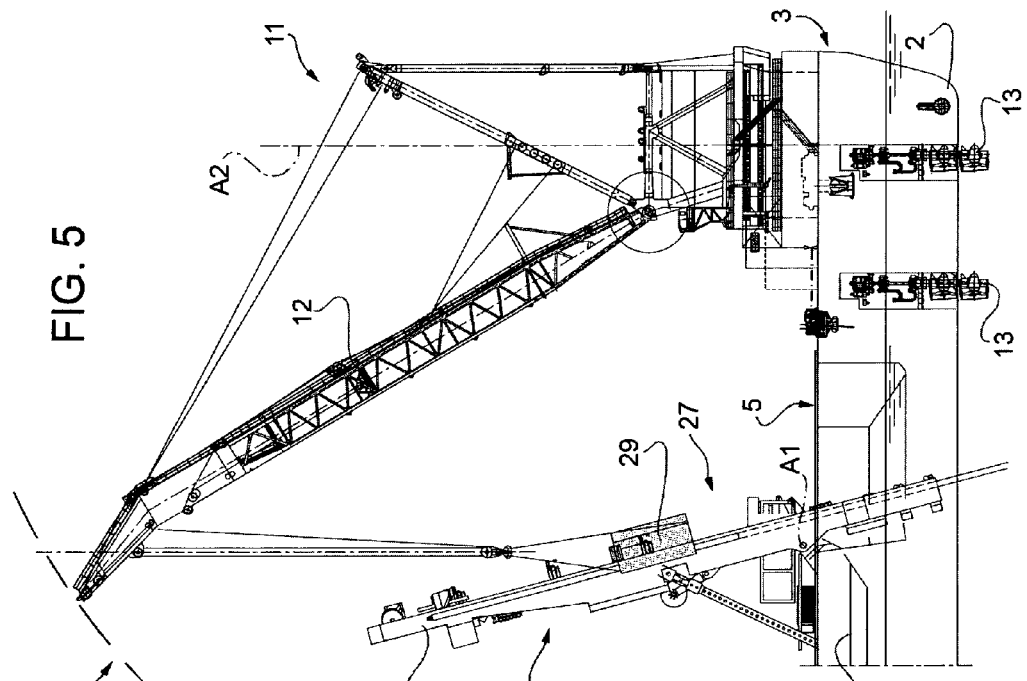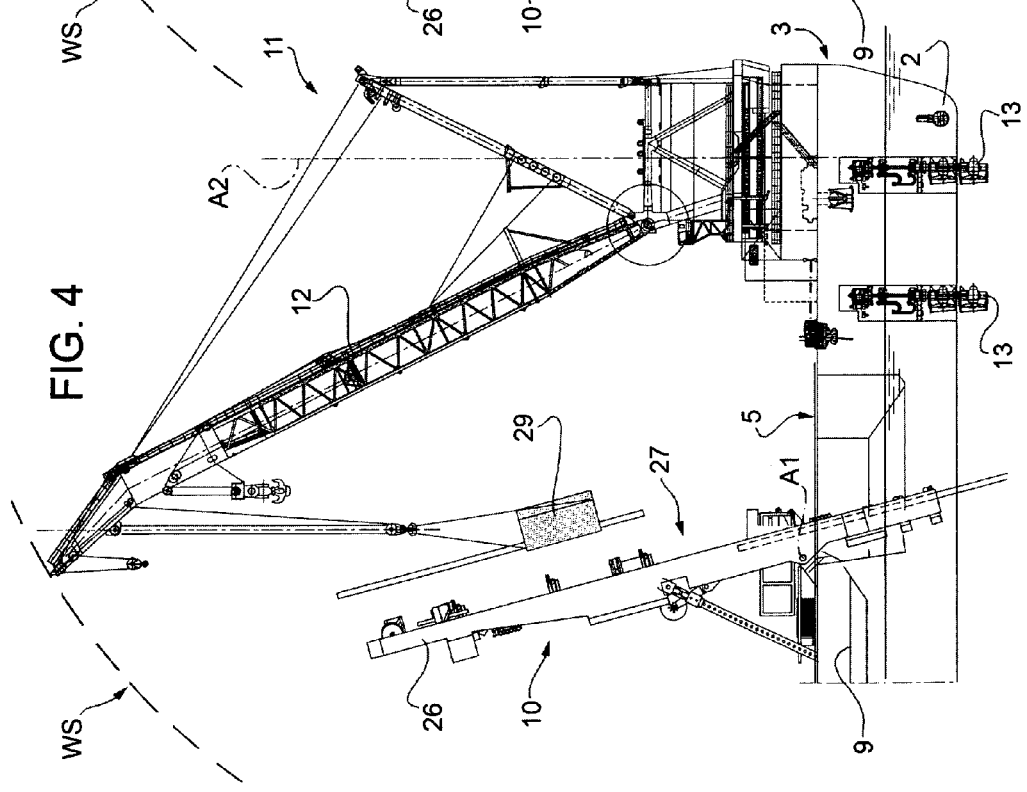

MULTIPURPOSE DEEPWATER VESSEL

TECHNICAL FIELD

The present invention relates to a multipurpose deepwater vessel.

BACKGROUND ART

The oil and gas industry routinely carries out deepwater operations, such as laying underwater pipelines and hoisting loads for constructing floating or fixed infrastructures at sea. Pipeline laying is done using laying vessels equipped to fabricate the pipeline on board the vessel itself, and to lay the pipeline as it is fabricated. This is currently done using what are known as S-lay and J-lay methods. S-laying substantially comprises fabricating the pipeline on a substantially horizontal assembly line on the multipurpose vessel, and launching the pipeline off a curved laying ramp, in the course of which, the pipeline assumes an S shape between the vessel and the seabed.

In the J-lay method, the final stage in fabrication of the pipeline is conducted in a substantially vertical J-lay tower, from which the pipeline is launched and assumes a J shape between the vessel and the seabed. J-laying is preferable when working in very deep water, by subjecting the pipeline to less stress; whereas S-laying is preferable when working in relatively shallow water. S-laying, in fact, has the drawback of subjecting the pipeline to severe tensile stress caused by the movement of the laying vessel, but, if this is not considered a problem, is preferable by enabling faster output.

Crane vessels are also known, which have a weather deck and are equipped with heavy-duty cranes for constructing floating or fixed infrastructures at sea.

The Applicant's Patent Application WO 2008/148464 A1 describes a multipurpose vessel equipped with a heavy-duty crane incorporating a J-lay tower.

This solution has the big advantages of the J-lay tower allowing unimpeded operation of the heavy-duty crane, but has the drawback of not allowing the heavy-duty crane to cater fully to the J-lay tower.

Patent Application US 2002/0159839 A1 describes a vessel comprising a J-lay tower reclinable into a substantially horizontal position; and two heavy-duty cranes. In this case, the two cranes occupy practically the whole of the vessel, so little space is left on the weather deck for storing the pipe assemblies, or for the heavy loads handled by the heavy-duty cranes. Moreover, the J-lay tower is positioned with its working face facing away from the heavy-duty cranes, thus making cooperation between the cranes and the tower even more difficult.

The Applicant's Patent Application WO 00/05525 describes a multipurpose vessel equipped with two heavy-duty cranes at the bow; a J-lay tower at the bow; and a pipe assembly prefabrication line on the weather deck. This embodiment also impedes cooperation between the heavy-duty cranes and the J-lay tower, as when fitting the pipeline with valve assemblies and other parts much larger than and, at any rate, different from the pipes and pipe assemblies. Such parts are known as special parts (bulky items), differ in shape and/or size from the pipe assemblies, and cannot be handled using conventional pipe assembly handling equipment; whereas a heavy-duty crane is ideally suited to transfer them to the J-lay tower.

Known state-of-the-art vessels clearly fail to effectively combine the two underwater-pipeline laying and heavy-duty hoisting functions. In fact, very often, one function impedes the other.

DISCLOSURE OF INVENTION

It is an object of the present invention to provide a multipurpose deepwater vessel, in which the heavy-duty crane does not impede the underwater-pipeline laying function and, vice versa, the underwater-pipeline fabrication and laying equipment does not impede the heavy-duty hoisting function.

Another object of the present invention is to provide a multipurpose deepwater vessel, in which the heavy-duty crane cooperates easily and effectively with the laying equipment.

Another object of the present invention is to provide a high-output multipurpose deepwater vessel.

According to the present invention, there is provided a multipurpose deepwater vessel comprising:
- a floating structure, in turn comprising a bow; a stern; a weather deck; a first board and a second side; and a centreline;
- a J-lay tower hinged to the floating structure along the second board, and movable, about a first axis parallel to the weather deck, into a number of work positions;
- a heavy-duty crane connected at the bow to the floating structure to rotate about a second axis perpendicular to the weather deck, and having a boom defining an operating range; said J-lay tower, in any one of the work positions, being located within said operating range; and
- a preassembly line for joining pipes into pipe assemblies, each comprising at least two joined pipes;
and wherein said preassembly line is located below the weather deck and connected operationally to the J-lay tower.

In the present invention, the pipe assemblies are assembled below the weather deck and dispatched to the J-lay tower ready to be joined to the pipeline under construction, without cluttering the weather deck with pipe preparation or joining equipment. This therefore leaves ample space on the weather deck for hoisting work and pipe storage.

BRIEF DESCRIPTION OF THE DRAWINGS

A number of non-limiting embodiments of the present invention will be described by way of example with reference to the accompanying drawings, in which:

FIG. 3 shows a larger-scale section, with parts removed for clarity, of the FIG. 2 multipurpose vessel along line III-III;

FIGS. 4 and 5 show side views, with parts removed for clarity, of two operating stages of the FIG. 1 multipurpose vessel;

BEST MODE FOR CARRYING OUT THE INVENTION

Figure 1:
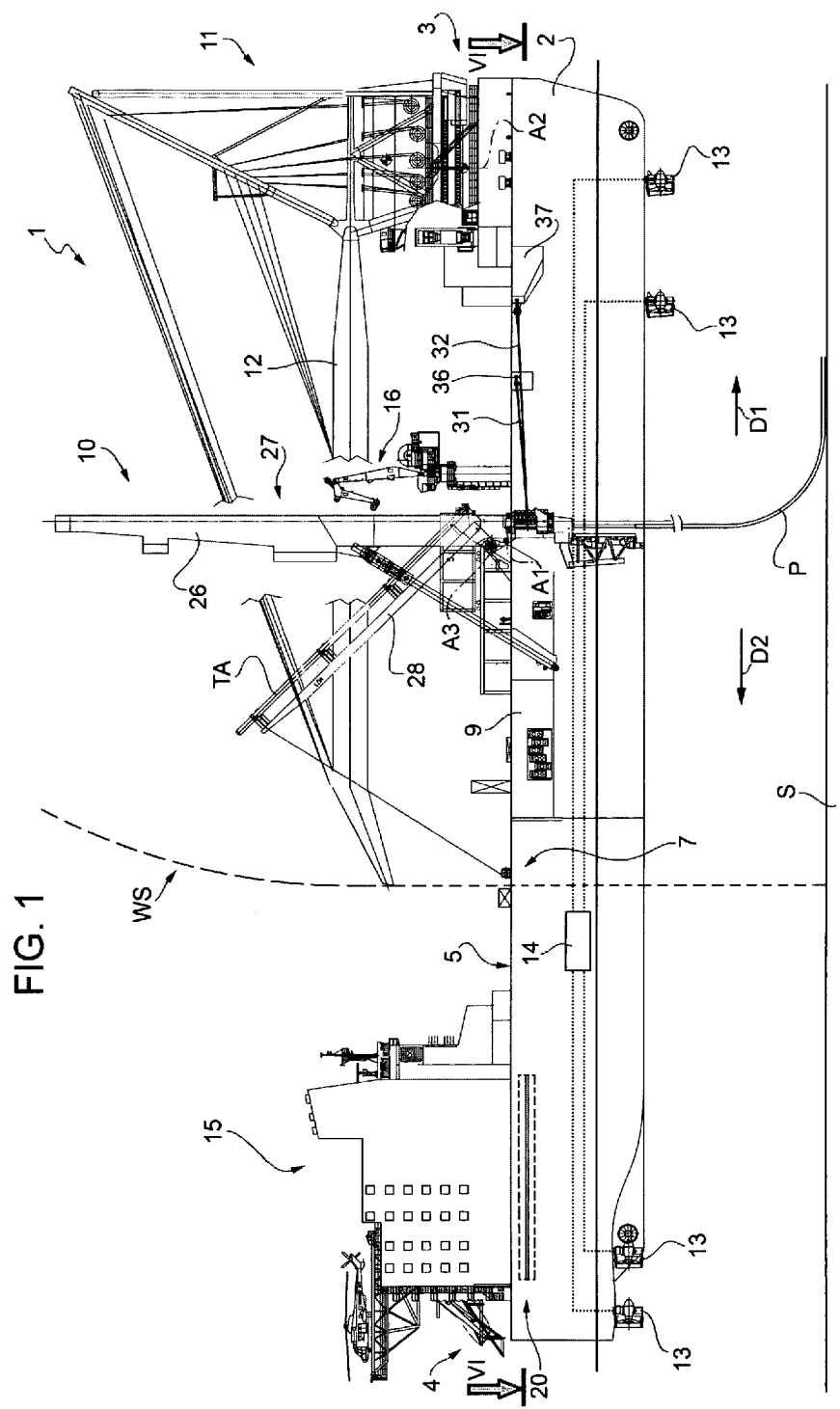
FIG. 1 shows a side view, with parts removed for clarity, of a multipurpose vessel in accordance with the present invention.

Number 1 in FIG. 1 indicates as a whole a multipurpose deepwater vessel, in particular for fabricating an underwater pipeline P on board vessel 1; laying pipeline P on the seabed; and hoisting heavy loads for the construction of floating or fixed infrastructures (not shown) at sea. In other words, multipurpose vessel 1 performs the functions of a laying vessel, crane vessel, and construction vessel in general.

Vessel 1 comprises a floating structure 2, in turn comprising a bow 3, a stern 4, a weather deck 5, a first side 6, a port side, second side 7 e.g., a starboard side (FIG. 2), a centreline 8 (FIG. 2), and a balcony 9 roughly halfway along second side 7; and a J-lay tower 10 hinged to balcony 9 of the floating structure and movable, about a first axis A1 parallel to weather deck 5, into a rest position (not shown) parallel to weather deck 5, and into a number of work positions to join pipe assemblies TA into an underwater pipeline P, and to lay pipeline P on the seabed S. More specifically, J-lay tower 10 rests on balcony 9 in the rest position, and is movable about axis A1 between a 0 and 98 degree angle with respect to weather deck 5.

In the example shown, floating structure 2 is a single-hull floating structure, roughly 200 m long and 50 m wide, though it is understood the present invention is not exclusive to this type of floating structure 2.

Vessel 1 comprises a heavy-duty crane 11 connected at bow 3 to floating structure 2 to rotate about a second axis A2 perpendicular to weather deck 5, and having a boom 12 defining an operating range WS. In the example shown, the heavy-duty crane has a 40-meter reach capacity of roughly 4000 tons, and J-lay tower 10 is located within operating range WS in any one of its work positions.

Vessel 1 comprises a number of thrusters 13, and a dynamic positioning system 14 connected to and for controlling thrusters 13. Vessel 1 travels to the work site in a direction D1 consistent with the above definitions of stern 4 and bow 3, and, when laying pipeline P, travels in a direction D2 opposite D1.

Vessel 1 also comprises a crew accommodation and administration block 15 at stern 4.

Figure 2:
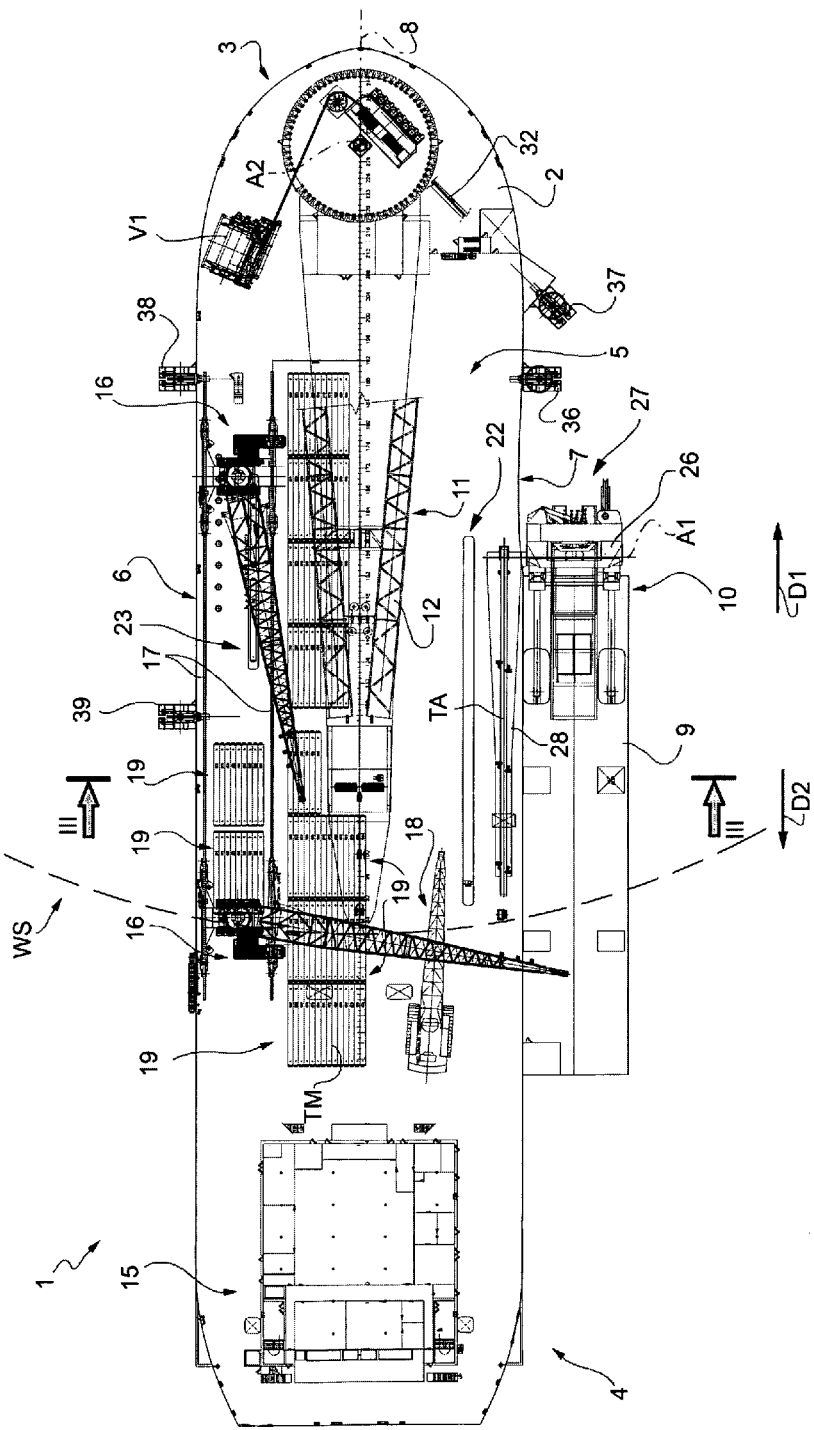
FIG. 2 shows a plan view, with parts removed for clarity, of the multipurpose vessel in FIG. 1.

With reference to FIG. 2, vessel comprises two gantry cranes 16, which run along tracks 17 parallel to centreline 8 and fixed to weather deck 5, close to first board 6; a crawler crane 18 that moves on weather deck 5; and a number of racks 19 installed on weather deck 5 to house standard-length (roughly 12 m) pipes TM for connection into pipe assemblies TA of multiple standard lengths.

Figure 6:
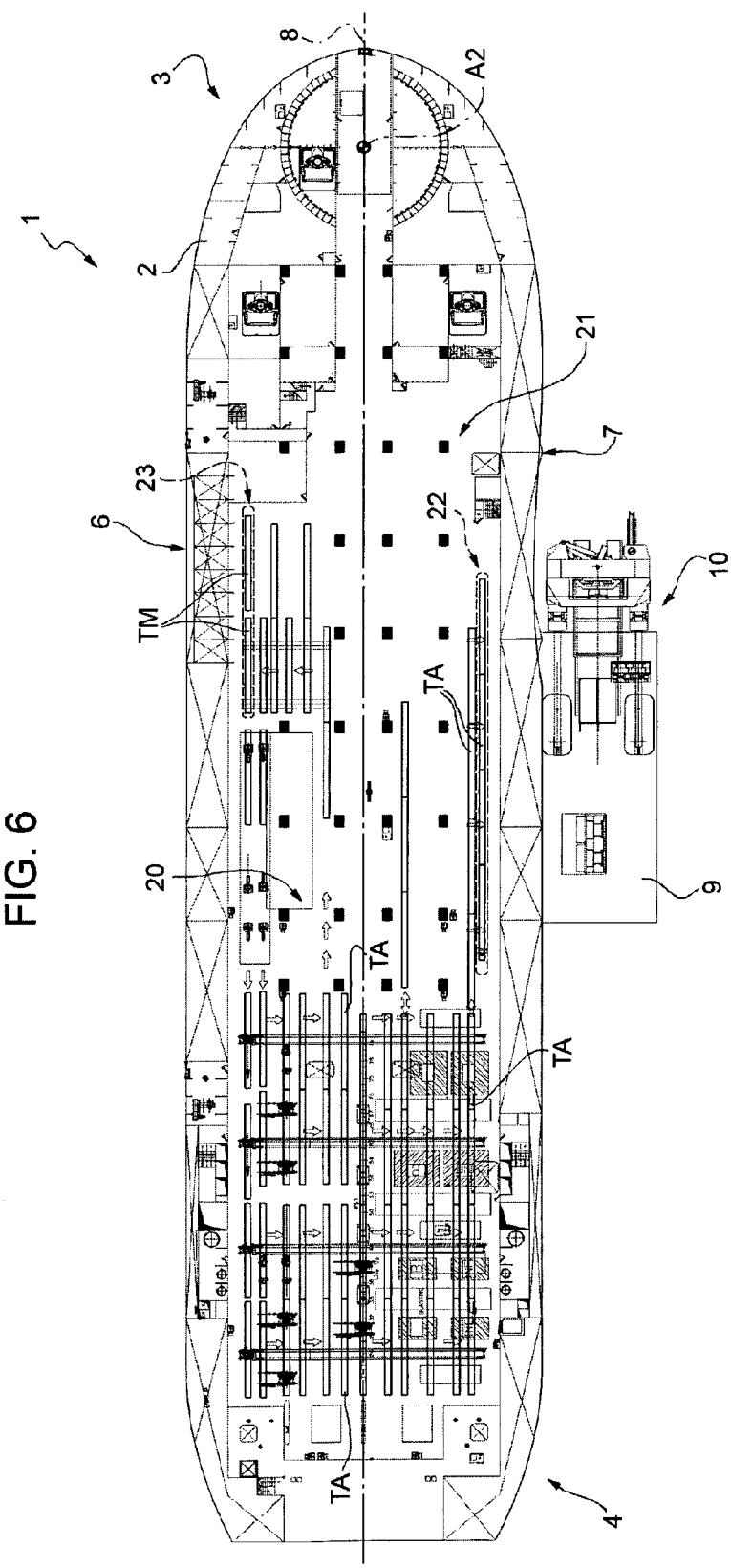
FIG. 6 shows a section, with parts removed for clarity, of the FIG. 1 multipurpose vessel along line VI-VI.

For this purpose, vessel 1 comprises a preassembly line 20 below weather deck 5 and connected operationally to J-lay tower 10 to feed pipe assemblies TA to J-lay tower 10 as shown in FIG. 6.

With reference to FIG. 6, preassembly line 20 extends from first board 6 to second board 7, on a deck 21 directly below weather deck 5. In the example shown, and with reference to FIG. 2, weather deck 5 has a first slit 22, close to balcony 9, through which to feed pipe assemblies TA; and a second slit 23, close to first side 6, through which to feed pipes TM.

With reference to FIG. 3, vessel 1 comprises a first elevator 24, at first slit 22, to raise pipe assemblies TA from preassembly line 20 to weather deck 5; and a second elevator 25 for lowering pipes TM from weather deck 5 to preassembly line 20.

With reference to FIG. 6, on preassembly line 20: the ends of pipes TM are chamfered; pipes TM are welded end to end, normally with four weld passes; weld quality is checked; and the joint is coated. On preassembly line 20 in the example shown, pipes TM are joined in groups of four to form roughly 48 m long pipe assemblies TA, and so reduce the number of joints to be made at J-lay tower 10, and increase laying speed and the output of vessel 1 as a whole. Pipes TM and pipe assemblies TA are always kept oriented the same way—in the example shown, parallel to centreline 8—and so move crosswise to their length on preassembly line 20.

With reference to FIG. 1, J-lay tower 10 comprises a structure 26 for assembling and conveying pipe assemblies TA, and which has an operating side 27 for handling pipe assemblies TA and facing bow 3 and heavy-duty crane 11 when J-lay tower 10 in a work position. J-lay tower 10 also comprises a loading arm 28 hinged to structure 26 about an axis A3, and movable between a position parallel to weather deck 5 to receive pipe assemblies TA (FIG. 3), and a position parallel to structure 26 to transfer pipe assemblies TA to structure 26 (FIG. 1 shows an intermediate position of loading arm 28).

With reference to FIG. 2, pipe assemblies TA are transferred from elevator 24 to loading arm 28 by one of the two gantry cranes 16; and pipes TM are fed from racks 19 to elevator 25 by the other of the two gantry cranes 16. As an alternative to using gantry cranes 16, the vessel is equipped with manipulators (not shown), close to slits, for transferring pipes and pipe assemblies.

With reference to FIG. 1, loading arm 28 is unable to feed structure 26 with special parts, which, in pipeline laying, means any parts differing in size and shape from pipe assemblies TA. When particularly large, special parts are also known as bulky items, are normally valves or T and Y fittings, etc., and are loaded onto structure 26 of the J-lay tower by heavy-duty crane 11, as shown in FIGS. 4 and 5. FIG. 4 shows a special part 29 suspended from heavy-duty crane 11 as it nears structure 26, which is tilted to receive part 29. In FIG. 5, special part 29 is positioned on structure 26, which is designed to grip and move it.

Figure 7:
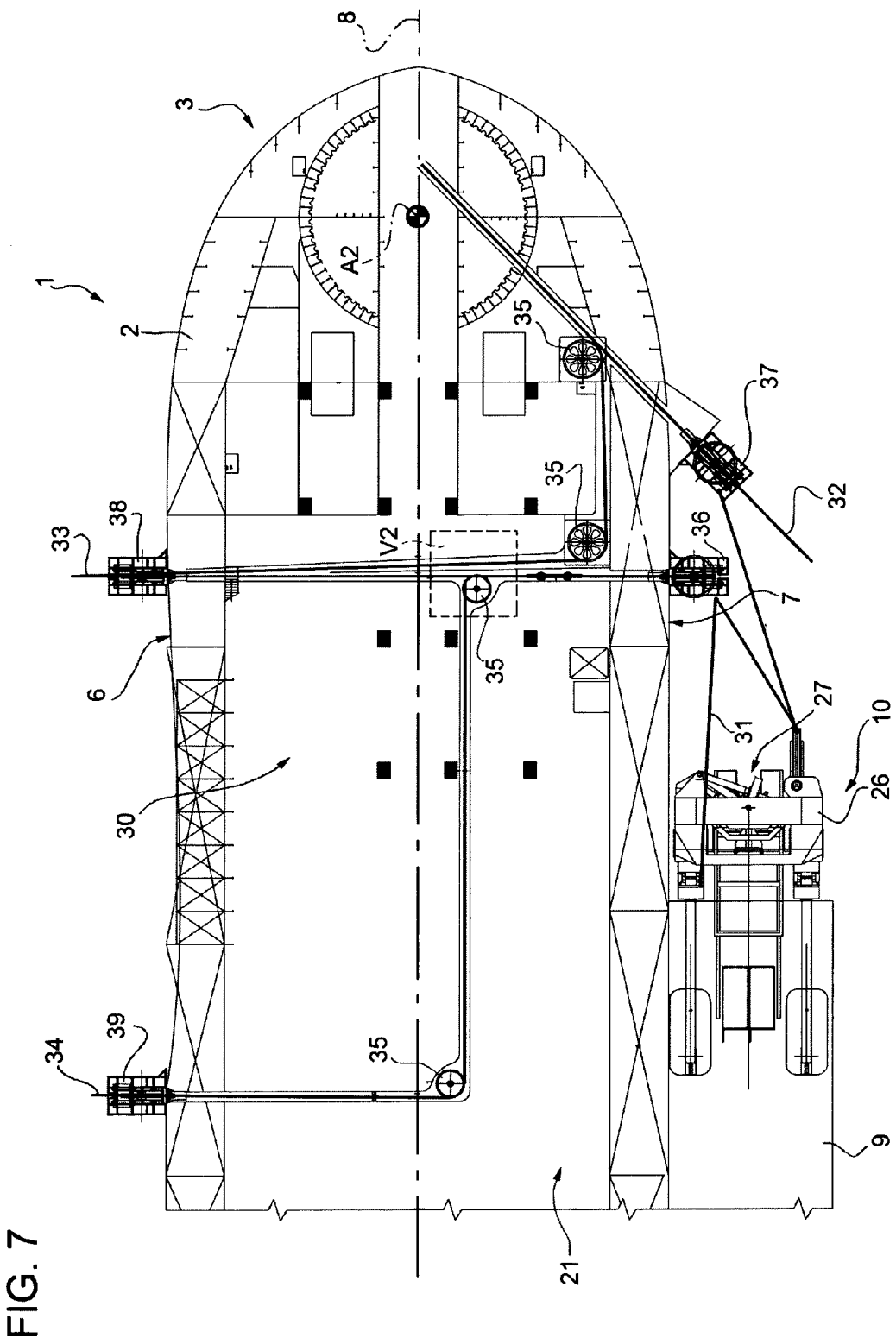
FIG. 7 shows a larger-scale plan view in section, with parts removed for clarity, of the bow area.

With reference to FIG. 7, vessel 1 comprises a hoisting assembly 30 for carrying out underwater lifting and lowering operations, and in particular for releasing and recovering the pipeline under construction onto and off the seabed. Hoisting assembly 30 is located at least partly below weather deck 5, and comprises four hoisting lines 31, 32, 33, 34, which run about pulleys 35 and are connectable indifferently to a winch V1 on weather deck (FIG. 2) and a winch V2 below deck 21. Hoisting assembly 30 also comprises four fairleads 36, 37, 38, 39 for guiding respective hoisting lines 31, 32, 33, 34, and which are fixed to floating structure 2, where the hoisting lines come out, and are located within the operating range WS of heavy-duty crane 11, so loads can be transferred between one of hoisting lines 31, 32, 33, 34 and heavy-duty crane 11.

Fairleads 36, 37 are located along second board 7 at bow 3, fairlead 38 is located along first board 6 at bow 3, and fairlead 39 is located along first side 6, between bow 3 and stern 4.

To enhance the flexibility of hoisting assembly 30, pulleys 35 are so arranged that any one of hoisting lines 31, 32, 33, 34 can be routed for operation by each of winches V1, V2, which are preferably of different capacities.

Lines 31 and 32 can be run into J-lay tower 10 for pipeline release and recovery work.

Figure 8:
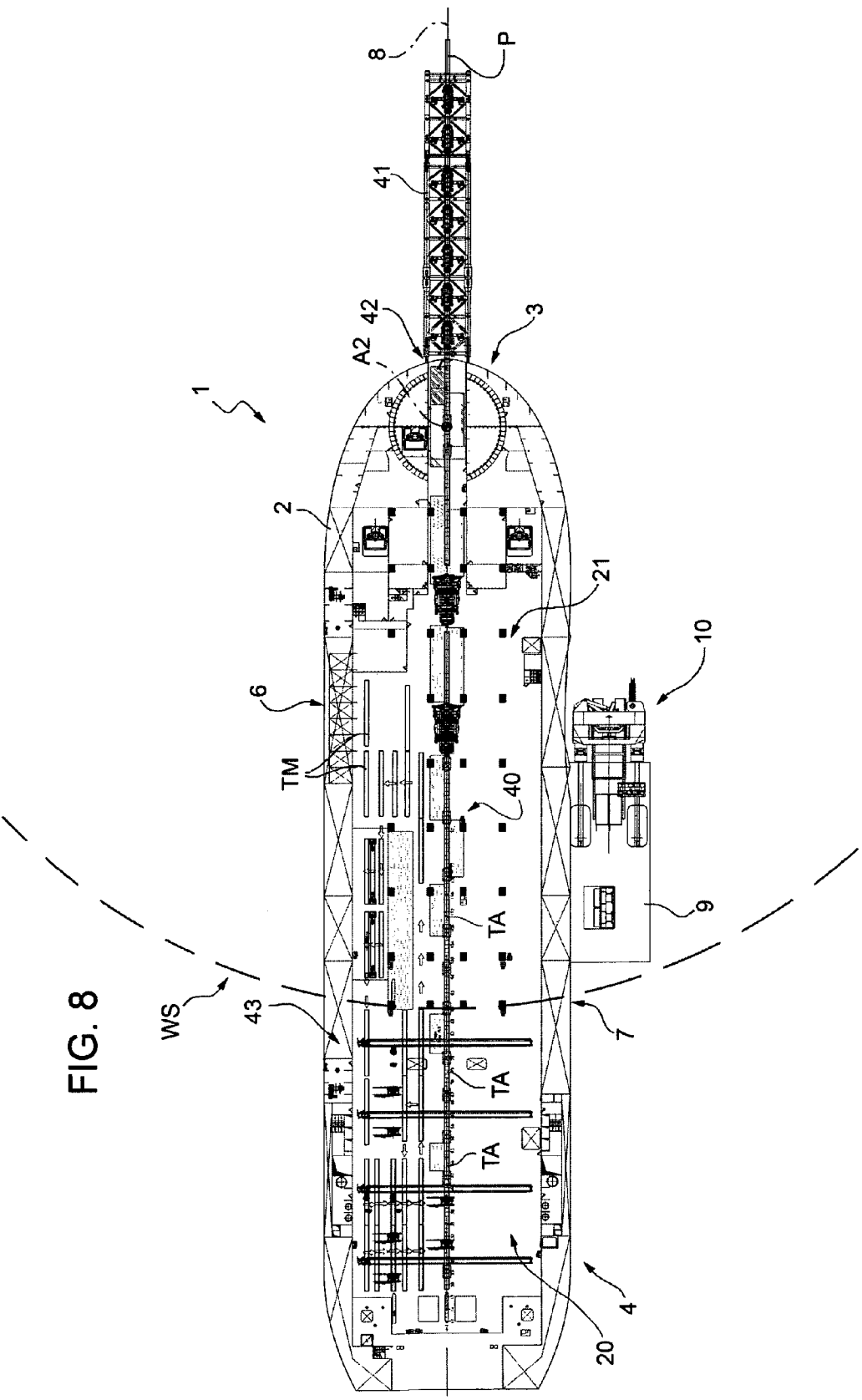
FIG. 8 shows a section of a variation of the FIG. 1 multipurpose vessel.

In the FIG. 8 variation, in addition to the J-lay tower, multipurpose vessel 1 also comprises a longitudinal assembly line 40 below weather deck 5, preferably close to centreline 8; and a lay ramp (stinger) 41 fixed to floating structure 2 at bow 3, and defining an ideal continuation of longitudinal assembly line 40. Longitudinal assembly line 40 is a line on which pipe assemblies TA advance in line with one another and are joined to form pipeline P, extends from stern 4 to bow 3, and joins up with lay ramp 41 at an exit port 42 formed in floating structure 2 and closed by a door (not shown).

Exit port 42 and lay ramp 41 are within the operating range WS of, and can therefore be catered to by, heavy-duty crane 11.

Longitudinal assembly line 40 is connected operationally to a preassembly line 43 located below weather deck 5, and for forming pipe assemblies TA of two pipes TM joined to each other along a path along which both pipes TM and pipe assemblies TA travel crosswise to their length. Preassembly line 43, in fact, is the part of preassembly line 20 extending from first board 6 to centreline 8, and can therefore only form pipe assemblies TA of two pipes TM. This does not pose a drawback, however, on account of longitudinal assembly line 40 having a much higher output than J-lay tower 10, and so being able to make numerous joints.

The present invention has numerous advantages, such as combining a J-lay tower with high output and an extensive loading area on the weather deck, which in fact allows for storing large numbers of pipes, thus simplifying pipe procurement, and has room for the heavy loads handled by the heavy-duty crane.

The heavy-duty crane and the J-lay tower are so located as to cooperate in a number of work positions of the tower.

The heavy-duty crane can also cooperate with the hoisting lines of the hoisting assembly and, in the variation, also with the lay ramp if S-laying is opted for.

The vessel can operate in both S- and J-lay modes, can select the pipeline laying mode best suited to specific situations, and can even switch the same pipeline from S-lay to J-lay mode, and vice versa; in which case, some of the preassembly operations are advantageously shared.

Clearly, changes may be made to the embodiment of the present invention as described herein without, however, departing from the scope of the accompanying Claims.

The invention claimed is:

1. A multipurpose deepwater vessel comprising:
   a floating structure, in turn comprising a bow; a stern; a weather deck; a first side and a second side; and a centerline;
   a J-lay tower hinged to the floating structure along the second side, and movable, about a first axis parallel to the weather deck, into a number of work positions;
   a heavy-duty crane connected at the bow to the floating structure to rotate about a second axis perpendicular to the weather deck, and having a boom defining an operating range; said J-lay tower, in any one of the work positions, being located within said operating range; and
   a preassembly line for joining pipes into pipe assemblies, each comprising at least two pipes;
   wherein said preassembly line is located below the weather deck and connected operationally to the J-lay tower.

2. A multipurpose vessel as claimed in claim 1, wherein said preassembly line extends from the first side to the second side.

3. A multipurpose vessel as claimed in claim 2, wherein said weather deck has a first slit close to the second side and sized to permit throughfeed of the pipe assemblies; the multipurpose vessel comprising a first elevator located at the first slit to raise the pipe assemblies from the preassembly line to the weather deck.

4. A multipurpose vessel as claimed in claim 3, wherein said weather deck has a second slit close to the first side and sized to permit throughfeed of the pipes; the multipurpose vessel comprising a second elevator for lowering the pipes from the weather deck to the preassembly line.

5. A multipurpose vessel as claimed in claim 1, wherein said J-lay tower is movable about the first axis into a rest position substantially parallel to the weather deck.

6. A multipurpose vessel as claimed in claim 1, wherein said J-lay tower has an operating side for manipulating the pipe assemblies, and which faces the heavy-duty crane when the J-lay tower is in any one of the work positions.

7. A multipurpose vessel as claimed in claim 1, further comprising an S-lay longitudinal assembly line located below the weather deck.

8. A multipurpose vessel as claimed in claim 7, wherein the floating structure has an exit port for an underwater pipeline; the exit port being located at the bow, within the operating range of the heavy-duty crane.

9. A multipurpose vessel as claimed in claim 8, further comprising a lay ramp attachable to the floating structure, close to the exit port.

10. A multipurpose vessel as claimed in claim 7, further comprising a further preassembly line located below the weather deck and extending from the first side to the centerline to join pipes into pipe assemblies, and to feed the pipe assemblies to the longitudinal assembly line.

11. A multipurpose vessel as claimed in claim 10, wherein said further preassembly line forms part of the preassembly line for joining the pipes and feeding the pipe assemblies to said J-lay tower.

12. A multipurpose vessel as claimed in claim 7, wherein the S-lay longitudinal assembly line is located close to the centerline.

13. A multipurpose vessel as claimed in claim 1, further comprising a hoisting assembly for underwater lifting and lowering operations, and in particular for releasing the pipeline under construction onto the seabed, and for recovering the pipeline under construction off the seabed; the hoisting assembly being located at least partly below the weather deck, and comprising at least one hoisting line, and at least one fairlead for guiding said hoisting line at the exit from the floating structure; said fairlead being located within the operating range of the heavy-duty crane, so loads can be transferred between the hoisting assembly and the heavy-duty crane.

14. A multipurpose vessel as claimed in claim 13, wherein the hoisting assembly comprises a number of fairleads within the operating range of the heavy-duty crane; at least one winch; and a number of pulleys defining a number of routes between said winch and the number of fairleads, so as to define a number of hoisting lines that can be operated by said winch.

15. A multipurpose vessel as claimed in claim 14, wherein the hoisting assembly comprises a further winch located to operate said number of hoisting lines from a different location from said winch.

16. A multipurpose vessel as claimed in claim 1, wherein said floating structure is a single-hull floating structure.

17. A multipurpose vessel as claimed in claim 1, further comprising a number of thrusters, and a dynamic positioning system connected to and for controlling the thrusters.

18. A multipurpose vessel as claimed in claim 1, wherein the heavy-duty crane has a 40 meter reach capacity of over 2000 tons.

19. A multipurpose vessel as claimed in claim 18, wherein the capacity is 4000 tons.

20. A multipurpose vessel as claimed in claim 1, wherein the first side is a port side; and wherein the second side is a starboard side.

* * * * *